Jan. 16, 1934.  E. W. HOLL  1,943,866
TWO-PART SERVICE GLASS
Filed March 30, 1933
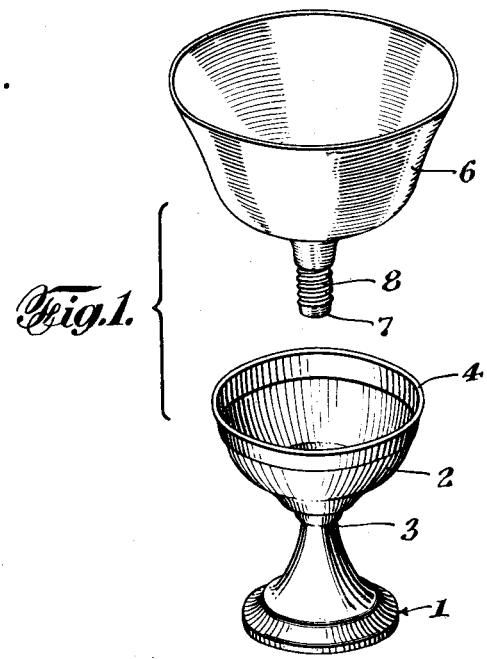
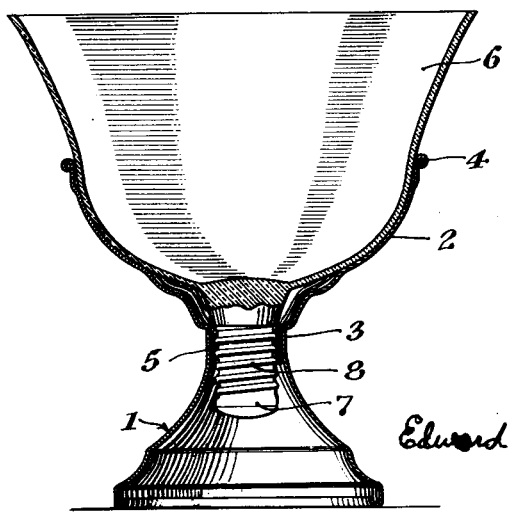
Edward William Holl
INVENTOR
BY
ATTORNEYS.

Patented Jan. 16, 1934

1,943,866

UNITED STATES PATENT OFFICE 1,943,866

TWO-PART SERVICE GLASS

Edward William Holl, Brooklyn, N. Y.

Application March 30, 1933. Serial No. 663,485

1 Claim. (Cl. 65—13)

The present invention relates to improvements in a two-part service receptacle such for instance as is used for serving food products like sherbet, etc., the upper part of the receptacle being in the form of a glass bowl and the lower part in the form of a metal stand upon which the bowl part is removably mounted.

The improved two-part receptacle comprises a metal base member formed of two hollow cone shaped parts reversely arranged and permanently secured together to constitute a downwardly presented flared base and an upwardly presented flared cup to receive the glass upper part. The upwardly presented cup portion of the base is of proper size and extent to embrace a substantial portion of the upper glass bowl. The cone-shaped parts of the base are attached with their small ends secured together and formed with a hollow opening which is screw threaded to receive the screw threaded stem projecting from the glass upper part. The threaded stem of the glass upper part of the receptacle is molded upon the bowl in the process of manufacture, the stem being preferably spread outwardly toward the bowl while it is being molded. The new form of two-part receptacle presents a more substantial article in that the cup shaped part of the base more completely embraces the substantial part of the glass bowl and thereby affords a more stable article which is less liable to be upset and broken. The form of the base member lends itself to economy of manufacture while retaining a sufficiently substantial character to serve the purpose for which it is intended.

In order that the invention may be fully understood it will first be described with reference to the accompanying drawing and the novelty afterwards pointed out in the annexed claim.

In said drawing

Figure 1 is a perspective view of the two-part receptacle with the parts in separated position;

Figure 2 is a vertical sectional view of the same with the two parts secured together.

The base member comprises the lower substantially cone shaped part 1 and the upper expanded cone shaped member 2 formed of relatively thin gauge spun metal and having their adjacent reduced ends united at 3 by means of solder, spinning or other well-known means. The restricted section 3 forms the handle of the base member. The base member may be suitably ornamented and the upper edge of member 2 is preferably finished by a turned over beading 4.

The opening through the central contracted portion 3 of the base member is threaded as indicated at 5, the threading of the lower part of member 2 which projects into the upper part of member 1 serving also to strengthen the attachment between the parts 1 and 2 of the base.

6 is the flared bowl-shaped upper member of glass molded with a downwardly projecting stem 7 threaded at 8. The threaded stem fits and screws into the threaded contracted portion of the base for holding the glass bowl in place in the cup shaped upper member 2 of the base. The concavity of the upper part 2 of the base corresponds with the convexity of the lower portion of the glass upper part 6 so that when the stem is threaded into the neck of the base the glass bowl portion will be firmly embraced and supported by the part 2 of the base.

The stem 7 is preferably molded upon the lower part of the top member 6 in process of manufacture, these parts being strengthened by a slight outwardly flaring of the stem as it merges into the bowl 6. It will be understood that the threaded connection between the base and bowl permits a ready separation for washing and also for replacement in case of breakage.

I claim:—

A two-part receptacle comprising a base member of relatively thin gauge metal formed of two approximately cone-shaped hollow parts, one of which parts has an externally and internally threaded reduced end which projects into and is permanently connected with the reduced hollow end of the other part to form an internally threaded contracted neck and the oppositely presented flared base and cup, in combination with a glass bowl having a convex lower surface fitting the flared cup of the base member and an integral threaded stem screwed into the threaded opening in the contracted neck of said base member, substantially set forth.

EDWARD WILLIAM HOLL.